US008930554B2

(12) United States Patent
Doleh et al.

(10) Patent No.: US 8,930,554 B2
(45) Date of Patent: Jan. 6, 2015

(54) TRANSFERRING SESSION DATA BETWEEN NETWORK APPLICATIONS ACCESSIBLE VIA DIFFERENT DNS DOMAINS

(71) Applicant: International Business Machines Corporation, Armonk, NY (US)

(72) Inventors: Yaser K. Doleh, North Royalton, OH (US); Jeffrey W. Lucas, Dunn, NC (US); Mauro Marzorati, Lutz, FL (US); Brian M. O'Connell, Research Triangle Park, NC (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/828,678

(22) Filed: Mar. 14, 2013

(65) Prior Publication Data

US 2013/0204920 A1 Aug. 8, 2013

Related U.S. Application Data

(63) Continuation of application No. 13/173,469, filed on Jun. 30, 2011, now Pat. No. 8,423,650.

(51) Int. Cl.
*G06F 15/16* (2006.01)
*H04L 29/06* (2006.01)
*H04L 29/08* (2006.01)
*H04L 29/12* (2006.01)

(52) U.S. Cl.
CPC .............. *H04L 67/02* (2013.01); *H04L 63/08* (2013.01); *H04L 67/142* (2013.01); *H04L 67/2814* (2013.01); *H04L 61/1511* (2013.01)
USPC .......................................................... 709/228

(58) Field of Classification Search
CPC ..................................................... H04L 67/142
USPC ................................................. 709/227–228
See application file for complete search history.

(56) References Cited

U.S. PATENT DOCUMENTS

| 6,539,494 | B1 * | 3/2003 | Abramson et al. ............. 714/4.3 |
| 6,628,644 | B1 * | 9/2003 | Nelson et al. ................. 370/352 |
| 7,200,665 | B2 * | 4/2007 | Eshghi et al. ................. 709/227 |
| 7,552,219 | B2 * | 6/2009 | Polozoff ........................ 709/227 |
| 7,996,542 | B2 * | 8/2011 | Polozoff ........................ 709/227 |
| 8,001,250 | B2 * | 8/2011 | Langen et al. ................. 709/227 |
| 8,271,667 | B2 * | 9/2012 | Hoshino et al. ............... 709/229 |

(Continued)

*Primary Examiner* — Lance L Barry
(74) *Attorney, Agent, or Firm* — Mark Vallone, Esq.; Rachel L. Pearlman, Esq.; Heslin Rothenberg Farley & Mesiti P.C.

(57) ABSTRACT

In a method for transferring session data from a first application accessible via at least one DNS name in a first DNS domain to a second application accessible via at least one DNS name in a second DNS domain, a computer receives via the first application a first HTTP request from an HTTP client, and in response, the computer establishes a first session with the HTTP client. The computer receives, from the HTTP client, a second HTTP request comprising an identifier of the second application, and in response, the computer stores in a memory a data structure identifiable by a data structure identifier and containing data pertaining to the first session. Responsive to storing the data structure, the computer transmits, to the HTTP client, an HTTP response comprising the data structure identifier, a redirection status code, and a URI comprising a DNS name in the second DNS domain.

17 Claims, 4 Drawing Sheets

(56) References Cited

U.S. PATENT DOCUMENTS

| | | | |
|---|---|---|---|
| 8,423,650 B2* | 4/2013 | Doleh et al. | 709/227 |
| 2002/0023159 A1* | 2/2002 | Vange et al. | 709/228 |
| 2003/0009562 A1* | 1/2003 | Heymann et al. | 709/227 |
| 2007/0198938 A1* | 8/2007 | Parham et al. | 715/745 |
| 2007/0208862 A1* | 9/2007 | Fox et al. | 709/227 |
| 2010/0241990 A1* | 9/2010 | Gabriel et al. | 715/810 |
| 2011/0289138 A1* | 11/2011 | Turakhia | 709/203 |

* cited by examiner

TRANSFERRING SESSION DATA BETWEEN NETWORK APPLICATIONS ACCESSIBLE VIA DIFFERENT DNS DOMAINS

CROSS-REFERENCE TO RELATED APPLICATION

This application is a continuation of U.S. Ser. No. 13/173,469, entitled "TRANSFERRING SESSION DATA BETWEEN NETWORK APPLICATIONS," filed Jun. 30, 2011, and published Jan. 3, 2013, as U.S. Patent Publication No. 2013/0007194 A1, and which is hereby incorporated herein by reference in its entirety.

TECHNICAL FIELD

The present invention relates to network applications, and more specifically, to transferring session data between network applications.

BACKGROUND

Many network applications are based on the Hypertext Transfer Protocol (HTTP), which does not inherently support sessions. The HTTP protocol defines only a simple request-response exchange: in the absence of a session tracking mechanism, an HTTP server treats every HTTP request independently of any previous requests originated by the same user agent instance.

A session tracking mechanism is needed, for example, for any application requiring user authentication. A session can be established responsive to the HTTP server validating a user's credentials, and all subsequent HTTP requests from the same user agent instance will be treated as originated by the authenticated user, unless the user agent sends a log-out command or the session otherwise terminates (e.g., by the user closing the browser or by the HTTP server expiring the session due to inactivity).

SUMMARY

A method according to one embodiment is for transferring session data from a first application accessible via at least one Domain Name System (DNS) name in a first DNS domain to a second application accessible via at least one DNS name in a second DNS domain. The method comprises the step of a computer receiving via the first application a first hypertext transfer protocol (HTTP) request from an HTTP client. The method further comprises the step of responsive to receiving the first HTTP request, the computer establishing a first session with the HTTP client. The method further comprises the step of the computer receiving a second HTTP request from the HTTP client, the second HTTP request comprising an identifier of the second application. The method further comprises the step of responsive to receiving the second HTTP request, the computer storing in a memory a data structure containing data pertaining to the first session, the data structure identifiable by a data structure identifier. The method further comprises the step of responsive to storing in the memory the data structure, the computer transmitting an HTTP response to the HTTP client, the HTTP response comprising the data structure identifier, a redirection status code, and a Uniform Resource Identifier (URI) comprising a DNS name in the second DNS domain.

A computer program product according to one embodiment is for transferring session data from a first application accessible via at least one Domain Name System (DNS) name in a first DNS domain to a second application accessible via at least one DNS name in a second DNS domain. The computer program product comprises one or more computer-readable tangible storage devices. The computer program product further comprises program instructions, stored on at least one of the one or more storage devices, to receive via the first application a first hypertext transfer protocol (HTTP) request from an HTTP client. The computer program product further comprises program instructions, stored on at least one of the one or more storage devices, to establish a first session with the HTTP client responsive to receiving the first HTTP request. The computer program product further comprises program instructions, stored on at least one of the one or more storage devices, to receive a second HTTP request from the HTTP client, the second HTTP request comprising an identifier of the second application. The computer program product further comprises program instructions, stored on at least one of the one or more storage devices, to store in a memory a data structure containing data pertaining to the first session responsive to receiving the second HTTP request, the data structure identifiable by a data structure identifier. The computer program product further comprises program instructions, stored on at least one of the one or more storage devices, to transmit an HTTP response to the HTTP client responsive to storing in the memory the data structure, the HTTP response comprising the data structure identifier, a redirection status code, and a Uniform Resource Identifier (URI) comprising a DNS name in the second DNS domain.

A computer system according to one embodiment is for transferring session data from a first application accessible via at least one Domain Name System (DNS) name in a first DNS domain to a second application accessible via at least one DNS name in a second DNS domain. The computer system comprises one or more processors, one or more computer readable memories and one or more computer-readable tangible storage devices. The computer system further comprises program instructions, stored on at least one of the one or more storage devices for execution by at least one of the one or more processors via at least one of the one or more memories, to receive via the first application a first hypertext transfer protocol (HTTP) request from an HTTP client. The computer system further comprises program instructions, stored on at least one of the one or more storage devices for execution by at least one of the one or more processors via at least one of the one or more memories, to establish a first session with the HTTP client responsive to receiving the first HTTP request. The computer system further comprises program instructions, stored on at least one of the one or more storage devices for execution by at least one of the one or more processors via at least one of the one or more memories, to receive a second HTTP request from the HTTP client, the second HTTP request comprising an identifier of the second application. The computer system further comprises program instructions, stored on at least one of the one or more storage devices for execution by at least one of the one or more processors via at least one of the one or more memories, to store in a memory a data structure containing data pertaining to the first session responsive to receiving the second HTTP request, the data structure identifiable by a data structure identifier. The computer system further comprises program instructions, stored on at least one of the one or more storage devices for execution by at least one of the one or more processors via at least one of the one or more memories, to transmit an HTTP response to the HTTP client responsive to storing in the memory the data structure, the HTTP response comprising the data structure identifier, a redirection status code, and a Uniform Resource Identifier (URI) comprising a DNS name in the second DNS domain.

DETAILED DESCRIPTION

Figure 1:
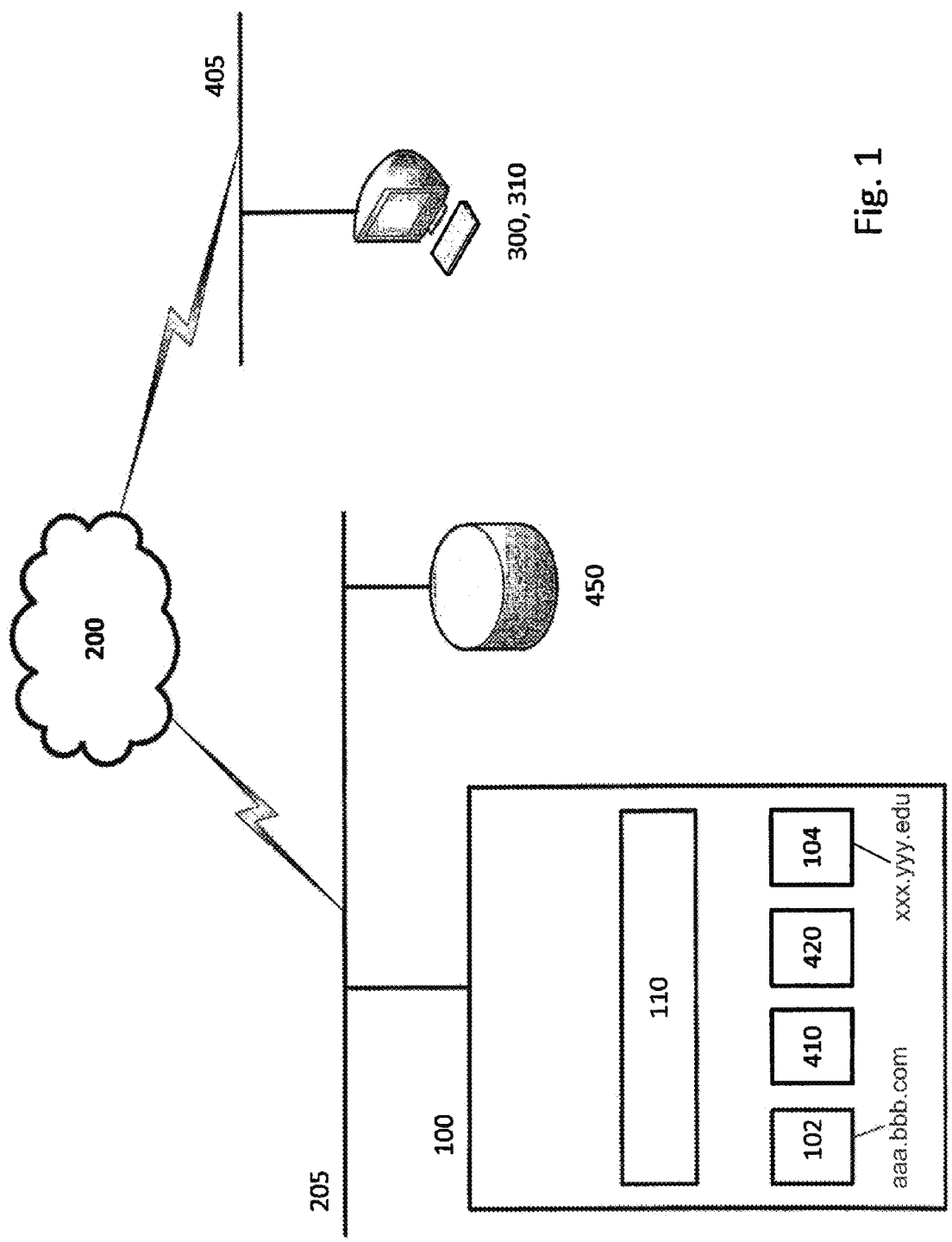
FIG. 1 depicts a block diagram of a system according to an illustrative embodiment of the invention.

Embodiments of the present invention are directed toward transferring session data between network applications. FIG. 1 depicts a block diagram of a system according to an illustrative embodiment of the invention. The system can transfer session data from a network-accessible application 102 to a network-accessible application 104. In one embodiment, computer 100 can execute both applications 102 and 104, as schematically shown in FIG. 1. In another embodiment (not shown in FIG. 1), one computer can execute at least one instance of application 102, while another computer can execute at least one instance of application 104.

Computer 100 can be connected to a network 200 directly or via an intermediate network 205. Network 200 can be provided, for example, by the Internet, an enterprise intranet, a LAN, or a private or a public WAN. Network 205 can be provided, for example, by an enterprise intranet, a LAN, or a private or public WAN.

A computer 310 can execute a client program 300. Computer 310 can be connected to network 200 directly or via intermediate network 405. Network 405 can be provided, for example, by an enterprise intranet, a LAN, or a private or public WAN.

In one embodiment, networks 200, 205 and 405 can carry Internet Protocol (IP) traffic. Computer 100 can be configured to execute an HTTP server process 110 configured to receive HTTP requests and to forward HTTP requests to applications 102 and 104. Applications 102 and 104 can be implemented as application servers configured to receive HTTP requests from HTTP server process 110 and to transmit HTTP responses back to HTTP server process 110. Client program 300 can be provided by a software program acting as an HTTP client. For example, client program 300 can be provided, for example, by a web browser, a web crawler, or a script. Hence, while this description might contain references to a user, a skilled artisan would appreciate the fact that numerous implementations of the disclosed systems, methods, and computer program products which do not require any user participation are within the scope of this disclosure.

In the embodiment of FIG. 1, each of computers 100 and 310 has at least one network interface and is connected to one network (networks 205 and 405, respectively). In another embodiment (not shown), computer 100 and/or computer 310 can have two or more network interfaces and can be connected to two or more networks.

Each of computers 100 and 310 can have one or more IP addresses associated with every network interface (two or more IP addresses can be associated with a single network interface using IP aliasing). Each of computers 100 and 310 can have one or more Domain Name System (DNS) names associated with every IP address.

While FIG. 1 does not show network routers, switches, firewalls, load balancers and other equipment necessary to enable network communications between computer 100 and client program 300, a skilled artisan would appreciate the fact that various methods of interconnecting networks 200, 205 and 405 are within the scope of this disclosure.

In one embodiment, applications 102 and 104 can require client authentication and hence, require session support. In one embodiment, a session can be defined as a sequence of requests and responses exchanged by a client program 300 and a server (e.g., application 102 or 104), beginning with the client authentication and ending by terminating client program 300, invoking a log-out function, or a client inactivity timeout. A skilled artisan would appreciate the fact that other ways of initiating and/or terminating a session are within the scope of this disclosure.

In one embodiment, one or both of applications 102 and 104 can use HTTP cookies for session support. Using a Set-Cookie header of an HTTP response, application 102 and/or 104 can send to client program 300 an alphanumeric string that client program 300 will return in future HTTP requests addressed to URIs identified by the cookie's Path and Domain directives. For example, application 102 and/or 104 can send to client program 300 a session identifier named SessionID with the value 123456. Client program 300 can then return the session identifier in subsequent HTTP requests.

In another embodiment, one or both of applications 102 and 104 can use dynamic Uniform Resource Locators (URLs) for session support. In a yet another embodiment, one of or both applications 102 and 104 can use HTTP forms with hidden fields for session support. In a yet another embodiment, one of or both applications 102 and 104 can use any combinations of cookies, dynamic URLs, and HTTP forms with hidden fields for session support. A skilled artisan would appreciate the fact that other methods of session support are within the scope of this disclosure.

In one embodiment, client program 300 can access application 102 using a DNS name belonging to one DNS domain, while client program 300 can access application 104 using a DNS name belonging to another DNS domain. In one embodiment, applications 102 and 104 can use the same authentication method and authority for client authentication. The authentication authority can be provided, for example, by a Lightweight Directory Access Protocol (LDAP) server 450.

In one illustrative embodiment, client program 300 can authenticate to application 102 by supplying a set of user's credentials, including a user identifier and a password, to application 102. In response to application 102 validating the credentials, application 102 can initiate a session with client program 300, e.g., by supplying a cookie containing a session identifier within a header of an HTTP response. However, should client program 300 attempt to issue an HTTP request to application 104, a new session (starting with a new authentication process) would be required, since client program 300 would not be able to send to application 104 a cookie issued by application 102, due to the fact that DNS names of applications 102 and 104 belong to different DNS domains. Furthermore, application 102 would not be able to issue to client program 300 a cookie intended for sending to application 104, since according to RFC-2109 dated February 1997, the fully qualified host name of the HTTP server issuing a cookie should domain-match the cookie's Domain attribute. The cookie's Domain attribute defines the DNS domain of the host(s) to which a client program, such as client program 300, should send the cookie.

To allow session transfer between applications 102 and 104, in one embodiment, transfer-out 410 and transfer-in 420 functions can be provided for execution by computer 100. Each of transfer-in function 420 and transfer-out function 410 can be implemented, for example, as a servlet or a JavaServer Pages (JSP) module. Client program 300 can access transfer-out function 410 using a DNS name in the DNS domain to which the DNS name of application 102 belongs, while client program 300 can access transfer-in function 420 using a DNS name in the DNS domain to which the DNS name of application 104 belongs.

The output of application 102 (e.g., HTML or JSP code) transmitted to client program 300 for rendering on the screen of computer 310 can contain a hyperlink inviting the user to transfer from application 102 to application 104. The hyperlink can be implemented, for example, using an HTML HREF attribute pointing to transfer-out function 410. An example of such an HTML HREF attribute is as follows:

<a href="http://tranfer-out.ibm.com?target=lotus.com/app104">Click here to go to Application 104</a>

A user wishing to transfer from application 102 to application 104 can click on a rendering of the above hyperlink in client program 300, thus invoking transfer-out function 410. In one embodiment, HTTP server process 110 can receive HTTP requests from client program 300 addressed to transfer-out function 410 and can route the HTTP requests to transfer-out function 410. In another embodiment, transfer-out function 410 can directly receive HTTP requests from client program 300 addressed to transfer-out function 410. In one embodiment, at least one instance of transfer-out function 410 can reside on the same computer 100 where at least one of applications 102 and 104 resides. In another embodiment, at least one instance of transfer-out function 410 can reside on a computer which does not host any instances of applications 102 and 104.

Transfer-out function 410 can store in a memory data structure at least part of the session data pertaining to the session between client program 300 and application 102, and then return an HTTP response to client program 300 to redirect client program 300 to a uniform resource identifier (URI) identifying transfer-in function 420. The URI can also include an identifier of the memory data structure containing at least part of the session data.

In response to receiving the HTTP response from transfer-out function 410, client program 300 can issue a new HTTP request using the URI identifying transfer-in function 420, an example of such URI being as follows:

GET http://transfer-in.lotus.com/app104/123 wherein 123 is the identifier of the data structure containing least part of the session data pertaining to the session between client program 300 and application 102.

In one embodiment, HTTP server process 110 can receive HTTP requests from client program 300 addressed to transfer-in function 420 and can then route the HTTP requests to transfer-in function 420. In another embodiment, transfer-in function 420 can directly receive HTTP requests from client program 300 addressed to transfer-in function 420. In one embodiment, at least one instance of transfer-in function 420 can reside on the same computer 100 where at least one of applications 102 and 104 resides. In another embodiment, at least one instance of transfer-in function 420 can reside on a computer which does not host any instances of applications 102 and 104.

In response to being invoked, transfer-in function 420 can extract the data structure identifier from the request-URI field of the HTTP request received from client program 300 and retrieve from memory the data structure containing at least part of the session data pertaining to the session between client program 300 and application 102. Transfer-in function 420 can return to client program 300 an HTTP response containing a Set-Cookie header defining a cookie, a redirection status code, and a URI that identifies application 104.

The cookie can contain at least part of the information retrieved from the memory data structure (for example, a user identifier and a hashed user password) which can be used by application 104 for establishing a new session with client program 300 without requiring the user to authenticate to application 104. The cookie's Domain directive can identify the domain to which the DNS name of application 104 belongs. Hence, client program 300 can return the cookie in subsequent HTTP requests addressed to application 104.

In response to receiving the HTTP response containing the redirection status code, client program 300 can issue a new HTTP request to application 104, substituting the request-URI field with the URI that identifies application 104:

GET http://lotus.com/app104

Client program 300 can include a Cookie field within the HTTP request to application 104, thus supplying to application 104 at least part of the information retrieved from the memory data structure (for example, a user identifier and a hashed user password) which can be used by application 104 for establishing a new session without requiring the user to authenticate.

Application 104 can extract the user credential information from the cookie, authenticate the user (e.g., utilizing an authentication authority such as against LDAP server 450), initiate a new user session, and return to client program 300 a cookie containing a new session identifier. Client program 300 can return the cookie with subsequent HTTP requests to application 104.

Figure 2A:
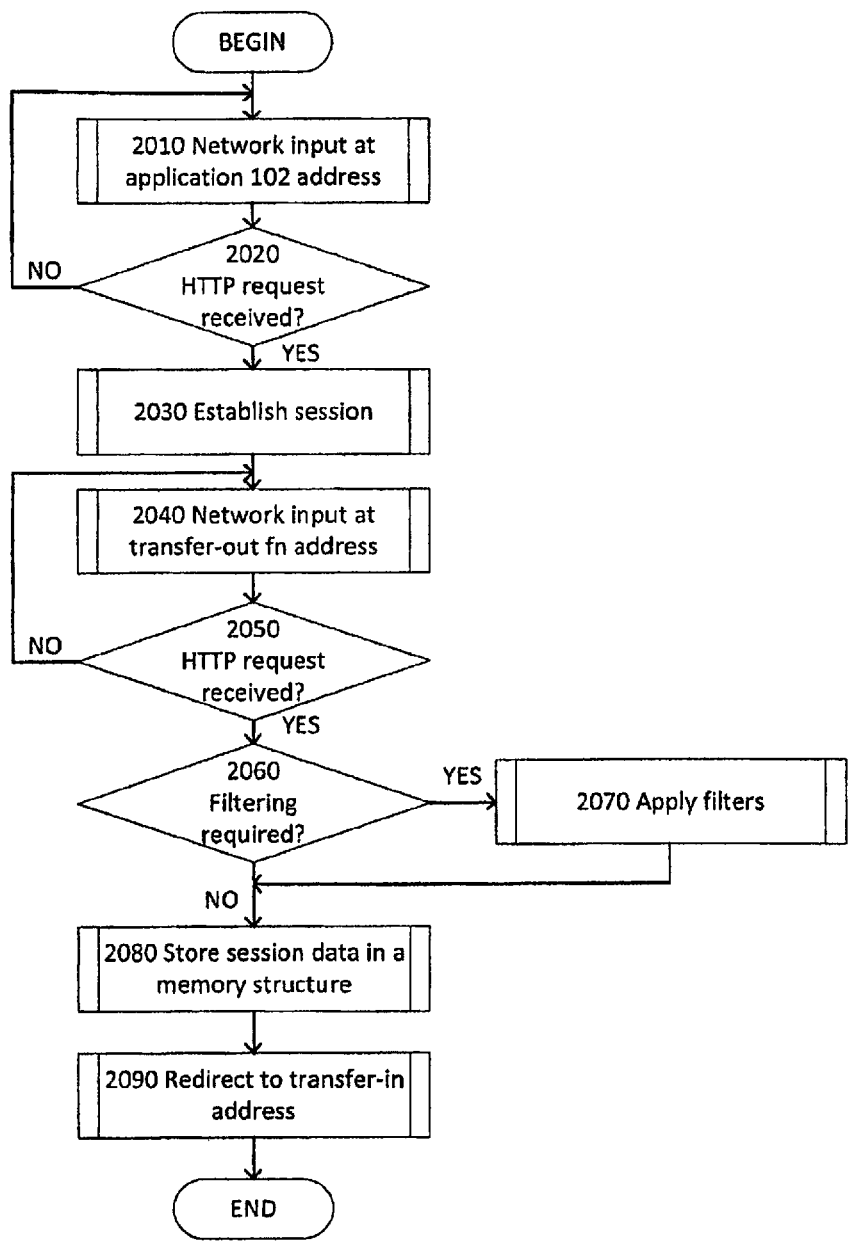
FIGS. 2a-2b depict flowcharts of methods that may be implemented in illustrative embodiments of the invention.
Figure 2B:
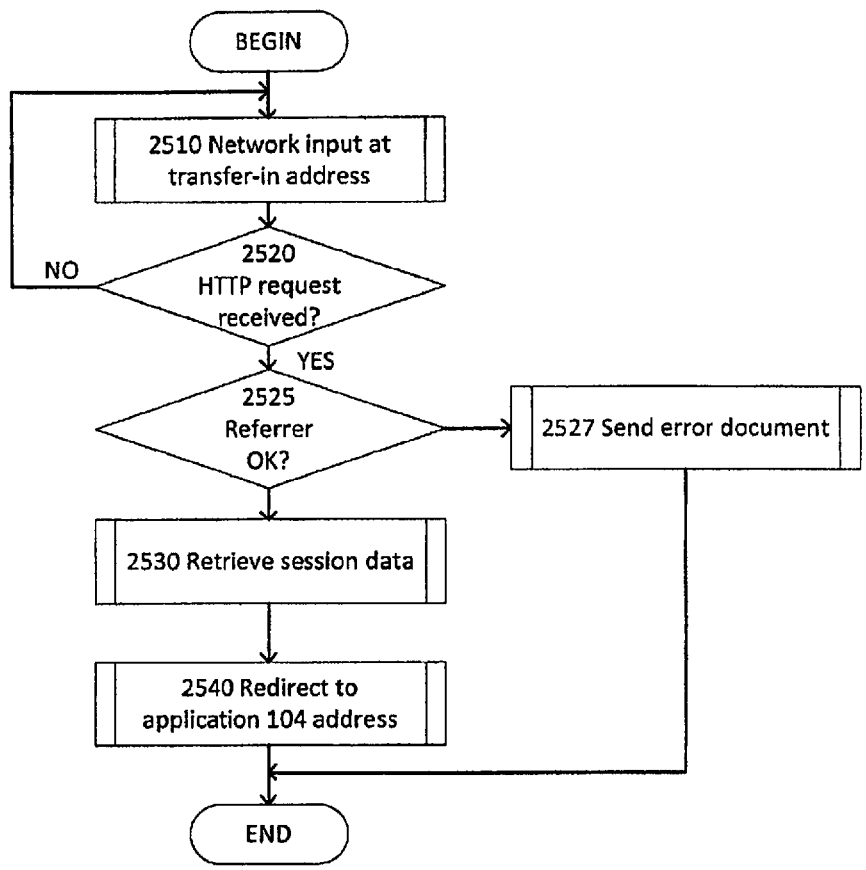

FIGS. 2a-2b depict flowcharts describing one embodiment of a method of transferring session data between network applications, with the flowchart of FIG. 2a describing one embodiment of a method implemented by transfer-out function 410 of FIG. 1 and the flowchart of FIG. 2b describing one embodiment of a method implemented by transfer-in function 420 of FIG. 1.

Referring now to FIG. 2a, processing commences by computer 100 receiving an HTTP request from client program 300 at the input loop defined by blocks 2010-2020. The HTTP request can contain a user's credential data, including, but not limited to, a user identifier and a hashed or encrypted user password.

At block 2030, application 102 can establish a session with client program 300. In one embodiment, application 102 can establish the session with client program 300 by inserting a cookie containing a session identifier into an HTTP response transmitted to client program 300. In another embodiment, application 102 can establish the session with client program 300 by inserting the session identifier into a dynamic URL to which client program 300 can be redirected using a redirection status code of an HTTP response transmitted by application 102 to client program 300. A skilled artisan would appreciate the fact that other methods of establishing a session are within the scope of this disclosure.

Transfer-out function 410 of FIG. 1 can be invoked by computer 100 receiving, at the input loop defined by blocks 2040-2050, an HTTP request from client program 300 wishing to transfer from application 102 to application 104. As noted herein supra, the output of application 102 (e.g., HTML or JSP code) transmitted to client program 300 for rendering on the screen of computer 310 can contain a hyperlink inviting the user to transfer to application 104. The hyperlink can be implemented, for example, using an HTML HREF attribute pointing to transfer-out function 410. An example of such an HTML HREF attribute is as follows:

<a href="http://tranfer-out.ibm.com?target=lotus.com/app104">Click here to go to Application 104</a>

A user wishing to transfer to from application 102 to application 104 can click on the above hyperlink, thus invoking transfer-out function 410.

At block 2060, transfer-out function 410 can determine whether a filtering of session data pertaining to the session between client program 300 and application 102 is necessary. The session data can comprise, for example, user credential data, user profile data, cookies, one or more user selectable options, browsing history, and the session expiration time. Responsive to transfer-out function 410 determining at block 2060 that the session data needs to be filtered, processing can continue at block 2070, wherein transfer-out function 410 can apply a pre-defined filter to the session data. The pre-defined filter can be specified, for example, on a per-application basis (i.e., a filter can be specified for every application 102 which transfers a session out, or for every application 104 which transfers a session in), on a per-user basis (i.e., a filter can be specified for every user in the user directory 450), or on a per-group basis (i.e., a filter can be specified for every user group). The pre-defined filter can comprise one or more data inclusion conditions or one or more data exclusion conditions. In one example, the pre-defined filter can comprise a data inclusion condition specifying that only user credential data needs to be transferred. Hence, at block 2070, transfer-out function 410 will select only user credential data for inclusion into the data structure to be stored in a memory by transfer-out function 410 at block 2080. In another example, the pre-defined filter can comprise a data exclusion condition specifying browsing history. Hence, at block 2070 transfer-out function 410 will select all of the session data except for the user's browsing history for inclusion into the data structure to be stored in a memory by transfer-out function 410 at block 2080.

Should transfer-out function 410 determine at block 2060 that no filtering of session data is necessary, processing can continue at block 2080, wherein transfer-out function 410 can store in a memory a data structure containing at least part of the session data.

The memory can be provided, for example, by a file system accessible to computer 100 (including a local file system or a file system accessible over a network), or by a random access memory (RAM) of computer 100. In one embodiment, the memory can be accessible, e.g., via network 205, by other computers (not shown in FIG. 1).

At block 2090, transfer-out function 410 can return to client program 300 an HTTP response containing a redirection status code, and a URI that identifies transfer-in function 420 (as noted herein supra, transfer-in function 420 can be accessible by client program 300 using a DNS name in the DNS domain to which the DNS name of application 104 belongs). The URI can also contain an identifier of the data structure in which transfer-out function 410 has previously stored at least part of the session data.

The redirection status code can be defined in accordance with RFC-1945 dated May 1996. For example, a status code of 302 ("moved temporarily") can be used. Upon completing operations described in block 2090, transfer-out function 410 can terminate.

In response to receiving the HTTP response containing the redirection status code from transfer-out function 410, client program 300 can issue a new HTTP request to the URI that identifies transfer-in function 420, an example of such URI being as follows:

GET http://transfer-in.lotus.com/app104/123 wherein 123 is identifier of the data structure containing least part of the session data pertaining to the session between client program 300 and application 102.

Referring now to FIG. 2*b*, transfer-in function 420 of FIG. 1 can be invoked by computer 100 receiving, at the input loop defined by blocks 2510-2520, the above described new HTTP request from client program 300.

In one embodiment, transfer-in function 420 can, at block 2525, determine whether contents of a Referrer header field of the new HTTP request matches the URI of transfer-out function 410. Responsive to transfer-in function 420 determining at block 2525 that the contents of the Referrer header field of the new HTTP request do not match the URI of transfer-out function 410, processing can continue at block 2527, wherein transfer-in function 420 can send an error document to client program 300 and terminate. Should transfer-in function 420 determine at block 2525 that the contents of the Referrer header field of the new HTTP request match the URI of transfer-out function 410, processing can continue at block 2530, wherein transfer-in function 420 can extract the data structure identifier from the request-URI field of the new HTTP request and, using the identifier, retrieve from memory the data structure containing at least part of the session data pertaining to the session between client program 300 and application 102. In one embodiment, to prevent replay attacks, transfer-in function 420 can, upon retrieving the data structure containing session data, erase the data structure from memory.

At block 2540, transfer-in function 420 can, in one embodiment, return to client program 300 an HTTP response containing a Set-Cookie header defining a cookie, a redirection status code, and a URI that identifies application 104. The redirection status code can be defined in accordance with RFC-1945 dated May 1996. For example, a status code of 302 ("moved temporarily") can be used.

The cookie can contain at least part of the information retrieved from the memory data structure (for example, a user identifier and a hashed user password) which can be used by application 104 for establishing a new session with client program 300 without requiring the user to authenticate to application 104. The cookie can also contain, for example, user profile data, one or more user selectable options, browsing history, and the session expiration time. The cookie's Domain directive can contain the domain to which the DNS name of application 104 belongs. Hence, client program 300 can return the cookie in subsequent HTTP requests addressed to application 104.

In another embodiment, instead of using cookies, transfer-in function 420 can insert at least part of the information retrieved from the memory data structure (for example, a user identifier and a hashed user password) into the URI sent to client program 300 within the HTTP response.

Upon completing operations described in block 2540, transfer-in function 420 can terminate.

In response to receiving the HTTP response containing the redirection status code from transfer-in function 420, client program 300 can issue a new HTTP request to application 104, substituting the request-URI field with the URI that identifies application 104:

GET http://lotus.com/app104

Client program 300 can include a Cookie field within the HTTP request to application 104, thus supplying to application 104 at least part of the information retrieved from the memory data structure (for example, a user identifier and a hashed user password) which can be used by application 104 for establishing a new session without requiring the user to authenticate.

Application 104 can extract the user credential information from the cookie, authenticate the user (e.g., utilizing an authentication authority such as LDAP server 450), initiate a new user session, and return to client program 300 a cookie containing the new session identifier. Client program 300 can return the cookie with subsequent HTTP requests to application 104.

Figure 3:
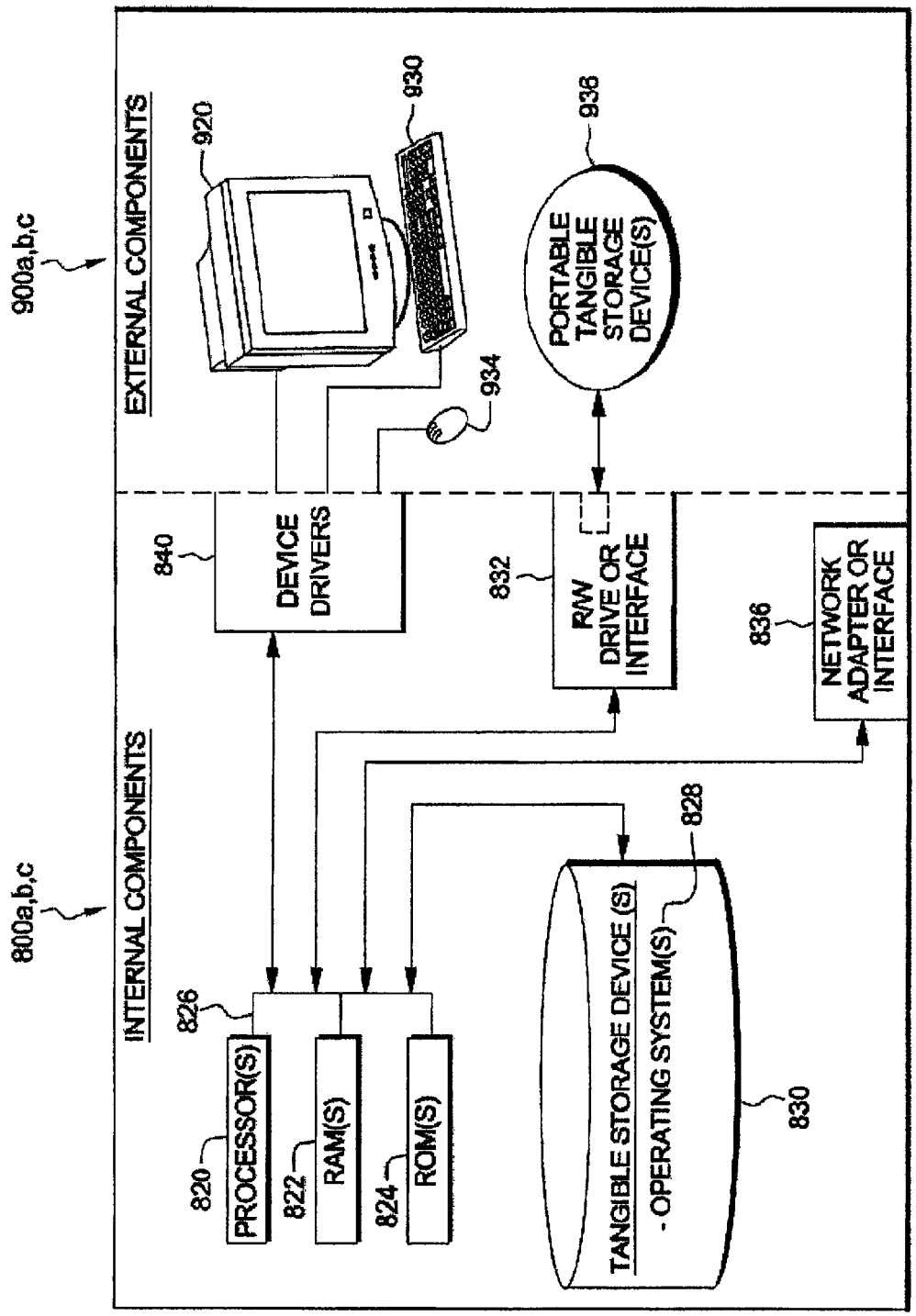
FIG. 3 is a hardware overview of a computer system according to an illustrative embodiment of the invention.

FIG. 3 illustrates hardware and software components of computers 100 and 310 of FIG. Computers 100 and 310 include respective sets of internal components 800a and 800b and external components 900a and 900b. Each of the sets of internal components 800a and 800b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 are stored on one or more of the computer-readable tangible storage devices 830 for execution by one or more of the processors 820 via one or more of the RAMs 822 (which typically include cache memory). On computer 100, and programs 102, 104, 410, and 420 are also stored on one or more of the computer-readable tangible storage devices 830 for execution by one or more of the processors 820 via one or more of the RAMs 822. On computer 310, client program 300 is also stored on one or more of the computer-readable tangible storage devices 830 for execution by one or more of the processors 820 via one or more of the RAMs 822. In the embodiment illustrated in FIG. 3, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a and 800b also includes a R/W drive or interface 832 to read from and write to one or more portable computer-readable tangible storage devices 936 such as a CD-ROM, DVD, memory stick, magnetic tape, magnetic disk, optical disk or semiconductor storage device. On computer 100, programs 102, 104, 410, and 420 can be stored on one or more of the portable computer-readable tangible storage devices 936, read via R/W drive or interface 832 and loaded into hard drive 830. On computer 310, client program 300 can be stored on one or more of the portable computer-readable tangible storage devices 936, read via R/W drive or interface 832 and loaded into hard drive 830.

Each set of internal components 800a and 800b also includes a network adapter or interface 836 such as a TCP/IP adapter card. Programs 102, 104, 410, and 420 can be downloaded to computer 100, and client program 300 can be downloaded to computer 310, from an external computer via a network (for example, the Internet, a local area network or other, wide area network) and network adapter or interface 836. From the network adapter or interface 836 of computer 100, programs 102, 104, 410, and 420 are loaded into hard drive 830. From the network adapter or interface 836 of computer 310, client programs 300 is loaded into hard drive 830. The network may comprise wires, optical fibers, wireless transmission, routers, firewalls, switches, gateway computers and/or edge servers.

Each of the sets of external components 900a and 900b includes a computer display monitor 920, a keyboard 930, and a computer mouse 940. Each of the sets of internal components 800a and 800b also includes device drivers 840 to interface to computer display monitor 920, keyboard 930 and computer mouse 940. The device drivers 840, R/W drive or interface 832 and network adapter or interface 836 comprise hardware and software (stored in storage device 830 and/or ROM 824).

Programs 102, 104, 300, 410, and 420 can be written in various programming languages including low-level, high-level, object-oriented or non object-oriented languages. Alternatively, the functions of programs 102, 104, 300, 410, and 420 can be implemented in whole or in part by computer circuits and other hardware (not shown).

Based on the foregoing, a computer system, method and program product have been disclosed for transferring session data between network applications. However, numerous modifications and substitutions can be made without deviating from the scope of the present invention. Therefore, the present invention has been disclosed by way of example and not limitation.

What is claimed is:

1. A method for transferring session data from a first application accessible via a domain name system (DNS) name in a first DNS domain to a second application accessible via a DNS name in a second DNS domain, the method comprising:
   receiving, at a first computer program function accessible via the DNS name in the first DNS domain, a hypertext transfer protocol (HTTP) request from a client computer program;
   filtering data pertaining to a session between the first application and the client computer program;
   in response to receiving the HTTP request, storing, in a memory, a data structure containing the filtered data pertaining to the session between the first application and the client computer program; and
   transmitting an HTTP response to the client computer program, the HTTP response being a response to the HTTP request and comprising an identifier of the data structure and an identifier of a second computer program function accessible via the DNS name in the second DNS domain.

2. The method of claim 1, further comprising:
   receiving, from the client computer program, an HTTP request to the second computer program function, and in response, transmitting an HTTP response including at least a portion of the filtered data and an identifier of the second application.

3. The method of claim 2, further comprising:
   receiving, from the client computer program, an HTTP request to the second application, the HTTP request to the second application comprising the at least a portion of the filtered data, the at least a portion of the filtered data comprising user information.

4. The method of claim 2, further comprising, before the transmitting of the HTTP response comprising the at least a portion of the filtered data and the identifier of the second application, a computer determining whether a field of the HTTP request to the second application matches an identifier of the first computer program function.

5. The method of claim 4, further comprising, responsive to the computer determining that the field of the HTTP request does not match the identifier of the first computer program function, sending an error to the client computer program.

6. The method of claim 1, wherein the filtering comprises selecting only user credential data for inclusion into the data structure.

7. A computer program product for transferring session data from a first application accessible via a domain name system (DNS) name in a first DNS domain to a second application accessible via a DNS name in a second DNS domain, the computer program product comprising one or more computer-readable storage devices and program instructions stored on at least one of the one or more storage devices, the program instructions comprising:

program instructions to receive, at a first computer program function accessible via the DNS name in the first DNS domain, a hypertext transfer protocol (HTTP) request from a client computer program;

program instructions to filter data pertaining to a session between the first application and the client computer program;

program instructions to, in response to receiving the HTTP request, store, in a memory, a data structure containing the filtered data pertaining to the session between the first application and the client computer program; and program instructions to transmit an HTTP response to the client computer program, the HTTP response being a response to the HTTP request and comprising an identifier of the data structure and an identifier of a second computer program function accessible via the DNS name in the second DNS domain.

8. The computer program product of claim 7, further comprising:

program instructions, stored on at least one of the one or more storage devices, to receive, from the client computer program, an HTTP request to the second computer program function, and in response, to transmit an HTTP response comprising at least a portion of the filtered data and an identifier of the second application.

9. The computer program product of claim 8, further comprising:

program instructions, stored on at least one of the one or more storage devices, to receive, from the client computer program, an HTTP request to the second application, the HTTP request to the second application comprising the at least a portion of the filtered data, the at least a portion of the filtered data comprising user information.

10. The computer program product of claim 8, further comprising:

program instructions, stored on at least one of the one or more storage devices, to determine whether a field of the HTTP request to the second application matches an identifier of the first computer program function before transmitting the HTTP response comprising the at least a portion of the filtered data and the identifier of the second application.

11. The computer program product of claim 10, further comprising:

program instructions, stored on at least one of the one or more storage devices, to send an error to the client computer program responsive to determining that the field of the HTTP request does not match the identifier of the first computer program function.

12. The computer program product of claim 7, wherein the program instructions to filter the data pertaining to the session select only user credential data for inclusion into the data structure.

13. A computer system for transferring session data from a first application accessible via a domain name system (DNS) name in a first DNS domain to a second application accessible via a DNS name in a second DNS domain, the computer system comprising one or more processors, one or more computer-readable storage devices, and program instructions stored on at least one of the one or more storage devices for execution by at least one of the one or more processors, the program instructions comprising:

program instructions to receive, at a first computer program function accessible via the DNS name in the first DNS domain, a hypertext transfer protocol (HTTP) request from a client computer program;

program instructions to filter data pertaining to a session between the first application and the client computer program;

program instructions to, in response to receiving the HTTP request, store, in a memory, a data structure containing the filtered data pertaining to the session between the first application and the client computer program; and program instructions to transmit an HTTP response to the client computer program, the HTTP response being a response to the HTTP request and comprising an identifier of the data structure and an identifier of a second computer program function accessible via the DNS name in the second DNS domain.

14. The computer system of claim 13, further comprising:

program instructions, stored on at least one of the one or more storage devices for execution by at least one of the one or more processors, to receive, from the client computer program, an HTTP request to the second computer program function, and in response, to transmit an HTTP response comprising at least a portion of the filtered data and an identifier of the second application.

15. The computer system of claim 14, further comprising:

program instructions, stored on at least one of the one or more storage devices for execution by at least one of the one or more processors, to receive, from the client computer program, an HTTP request to the second application, the HTTP request to the second application comprising the at least a portion of the filtered data, the at least a portion of the filtered data comprising user information.

16. The computer system of claim 14, further comprising:

program instructions, stored on at least one of the one or more storage devices for execution by at least one of the one or more processors, to determine whether a field of the HTTP request to the second application matches an identifier of the first computer program function before transmitting the HTTP response comprising the at least a portion of the filtered data and the identifier of the second application.

17. The computer system of claim 13, wherein the program instructions to filter the data pertaining to the session select only user credential data for inclusion into the data structure.

* * * * *